United States Patent
Wujcik et al.

(10) Patent No.: US 12,243,978 B2
(45) Date of Patent: Mar. 4, 2025

(54) THERMALLY RESPONSIVE SOLID STATE COMPOSITE ELECTROLYTE SEPARATOR

(71) Applicant: Blue Current, Inc., Hayward, CA (US)

(72) Inventors: Kevin Wujcik, Berkeley, CA (US); Joanna Burdynska, Berkeley, CA (US); Irune Villaluenga, Berkeley, CA (US)

(73) Assignee: Blue Current, Inc., Hayward, CA (US)

( * ) Notice: Subject to any disclaimer, the term of this patent is extended or adjusted under 35 U.S.C. 154(b) by 0 days.

(21) Appl. No.: 17/623,237

(22) PCT Filed: Jun. 26, 2020

(86) PCT No.: PCT/US2020/070200
§ 371 (c)(1),
(2) Date: Dec. 27, 2021

(87) PCT Pub. No.: WO2020/264579
PCT Pub. Date: Dec. 30, 2020

(65) Prior Publication Data
US 2022/0255116 A1    Aug. 11, 2022

Related U.S. Application Data

(60) Provisional application No. 62/868,729, filed on Jun. 28, 2019.

(51) Int. Cl.
*H01M 10/056* (2010.01)
*H01M 10/0525* (2010.01)

(52) U.S. Cl.
CPC ..... *H01M 10/056* (2013.01); *H01M 10/0525* (2013.01); *H01M 2300/0071* (2013.01);
(Continued)

(58) Field of Classification Search
CPC .................................................. H01M 10/056
See application file for complete search history.

(56) References Cited

U.S. PATENT DOCUMENTS 5,143,649 A    9/1992    Blackledge et al.
5,174,924 A    12/1992   Yamada et al.
(Continued)

FOREIGN PATENT DOCUMENTS

WO    WO 2017/120594 A2    7/2017

OTHER PUBLICATIONS

International Search Report and Written Opinion dated Sep. 14, 2020 issued in PCT Application No. PCT/US2020/070200.
(Continued)

*Primary Examiner* — Nathanael T Zemui
(74) *Attorney, Agent, or Firm* — Weaver Austin Villeneuve & Sampson LLP

(57) ABSTRACT

Provided herein are compositions of solid-state ionically conductive composite materials that include particles of an inorganic phase in a matrix of an organic phase having a positive thermal coefficient of expansion. When the temperature of the composition is below a cutoff temperature $T_c$, the composition is ionically conductive and may be used as an electrolyte. As the temperature increases above $T_c$, the organic phase expands and reduces the ionic conductivity of the composition.

24 Claims, 6 Drawing Sheets

(52) U.S. Cl.
CPC ............... *H01M 2300/0082* (2013.01); *H01M 2300/0091* (2013.01)

(56) References Cited

U.S. PATENT DOCUMENTS

| | | | |
|---|---|---|---|
| 5,928,547 | A | 7/1999 | Shea et al. |
| 6,238,598 | B1 | 5/2001 | Chen |
| 6,359,053 | B1 | 3/2002 | Chen |
| 6,620,343 | B1 | 9/2003 | Blok et al. |
| 7,544,311 | B2 | 6/2009 | Chen et al. |
| 9,926,411 | B1* | 3/2018 | Burdynska ........ H01M 10/0562 |
| 2004/0002002 | A1 | 1/2004 | Mizuta et al. |
| 2009/0214780 | A1 | 8/2009 | Hougham et al. |
| 2009/0311418 | A1 | 12/2009 | Hennige et al. |
| 2013/0171484 | A1 | 7/2013 | Baginska et al. |
| 2016/0028114 | A1* | 1/2016 | Pratt .................... H01M 4/621 429/309 |
| 2016/0093923 | A1 | 3/2016 | Wang et al. |
| 2016/0351973 | A1* | 12/2016 | Albano ................. H01M 4/628 |

OTHER PUBLICATIONS

MSE Supplies "List of Thermal Expansion Coefficients (CTE) for Natural and Engineered Materials": Publication [online}. Dec. 19, 2018 [retrieved Aug. 30, 2020}. Retrieved from the Internet <URL:https://www.msesupplies.com/pages/list-of-thermal-expansion-coefficients-cte-for-natural-and-engineered-materials>.

Polymer Properties Database "Glass Transition Temperature"; Publication [online}. Aug. 7, 2015 [retrieved Aug. 30, 2020]. Retrieved from the Internet: <URL: http://polymerdatabase.com/polymer°/o20physics/GlassTransition.html>; see entire document.

Azom "Crosslinked Polyethylene. XLPE"; Publication [onllne]. Sep. 10, 2001 [retrieved Aug. 31, 2020]. Retrieved from the Internet: <URL: https://www.azom.com/article.aspx? Article1D= 855>; see entire document.

Di Rican, Met al. "Composite solid electrolytes for all-solid-state lithium batteries" Mater. Sci.; Publication [online]. Nov. 17, 2018 [retrieved Aug. 30, 2020]. Retrieved from the Internet: <URL: https://www.sciencedirect.com/science/article/pii/S0927796X18301797>; DOI: 10.1016~.mser.2018.10.004; see entire document.

Morin, B., "Safety in Lithium Ion Batteries: State of the Art in Separators (Abstract)," Dreamweaver International Inc., 2 pages.

Bachman et al., "Inorganic Solid-State Electrolytes for Lithium Batteries: Mechanisms and Properties Governing Ion Conduction," Chemical Reviews, ACS Publications, http://dx.doi.org/10.1021/acs.chemrev.5b00563, pubs.acs.org/CR, 2016, 23 pages.

Gao et al., "Promises, Challenges, and Recent Progress of Inorganic Solid-State Electrolytes for All-Solid-State Lithium Batteries," Advanced Materials, www.advmat.de, 2018, 27 pages.

Manthiram et al., "Lithium battery chemistries enabled by solid-state electrolytes," Nature Reviews, vol. 2, Article No. 16103, 2017, 16 pages.

Dirican, M et al., "Composite Solid Electrolytes for all-solid-state Lithium Batteries", Materials Science and Engineering, Apr. 2019, vol. 136, pp. 27-46.

International Preliminary Report on Patentability dated Jan. 6, 2022 in PCT Application No. PCT/US2020/070200.

* cited by examiner

FIG. 6

| Current Collector 102 |
| Anode 104 |
| Electrolyte/Separator 106 |
| Cathode 108 |
| Current Collector 110 |

FIG. 7

| Current Collector 102 |
| Electrolyte/Separator 106 |
| Cathode 108 |
| Current Collector 110 |

FIG. 8

| Current Collector 102 |
| Anode 104 |
| Shutdown Separator 105 |
| Electrolyte 107 |
| Cathode 108 |
| Current Collector 110 |

FIG. 9

| Current Collector 102 |
| Anode 104 |
| Electrolyte 107 |
| Shutdown Separator 105 |
| Cathode 108 |
| Current Collector 110 |

FIG. 10

| Current Collector 102 |
| Anode 104 |
| Electrolyte 107 |
| Shutdown Separator 105 |
| Electrolyte 107 |
| Cathode 108 |
| Current Collector 110 |

THERMALLY RESPONSIVE SOLID STATE COMPOSITE ELECTROLYTE SEPARATOR

INCORPORATION BY REFERENCE

A PCT Request Form is filed concurrently with this specification as part of the present application. Each application that the present application claims benefit of priority of or priority to as identified in the concurrently filed PCT Request Form is incorporated by reference herein in its entirety and for all purposes.

BACKGROUND

Lithium ion batteries may include components that are flammable and/or volatile at high temperatures. If a battery short circuits, electrons flow uncontrollably from the anode to the cathode where they meet with lithium ions and spontaneously release the cells' electrochemical energy. This process generates significant heat that may lead to a rise in cell temperature, thermal runaway, and catastrophic failure events such as fire or explosion.

To reduce catastrophic failures, flammable liquid electrolyte may be replaced with nonflammable, solid electrolyte. Solid-state electrolytes may be less flammable than conventional liquid organic electrolytes. Solid electrolytes, however, are still subject to short circuiting, overcharging, and undesired temperature rise, and generally become more conductive with increasing temperature. As such, short circuiting may still cause lithium ions to flow from the anode to the cathode, leading to continuous heat generation and potential catastrophic failure.

SUMMARY

Disclosed herein are methods and systems relating to a solid-state electrolyte composition that may substantially and reversibly stop ionic conductivity above a transition temperature.

In one aspect of the disclosure a battery is disclosed, the battery including: an anode; a cathode; and an electrolyte positioned between the anode and the cathode, the electrolyte including a thermally responsive composite including: a plurality of inorganic particles that are ionically conductive between the anode and the cathode, and one or more polymers that have a positive coefficient of thermal expansion, wherein the electrolyte has a first ionic conductivity below a cutoff temperature ($T_c$), and a second ionic conductivity that is lower than the first ionic conductivity at or above $T_c$, wherein $T_c$ is between 60° C. and 180° C. In some embodiments, the second ionic conductivity is 50%, 10%, 1%, 0.1%, or 0.01% of the first ionic conductivity. In some embodiments, the plurality of inorganic particles are not electrically conductive. In some embodiments, the electrolyte has at least 50% of the ionic conductivity at room temperature, when cooled to room temperature after being heated above $T_c$.

In some embodiments, the plurality of inorganic particles include one or more materials selected from the group consisting of: perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO_4$, $0 \leq x \leq 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga; $Li_{10}SnP_2S_{12}$), garnets (e.g. $Li_7La_3Zr_2O_{12}$, $Li_5La_3M_2O_{12}$, M is Ta or Nb); NASICON-type Li ion conductors (e.g., $Li_{1.3}Al_{0.3}Ti_{1.7}(PO_4)_3$), oxide glasses or glass ceramics (e.g., $Li_3BO_3-Li_2SO_4$, $Li_2O-P_2O_5$, $Li_2O-SiO_2$), sulfide glasses or glass ceramics (e.g., $75Li_2S-25P_2S_5$, $Li_2S-SiS_2$, $LiI-Li_2S-B_2S_3$), argyrodites (e.g. $Li_{7-x}PS_{6-x}Ha_x$, where Ha is Cl or Br, and $0.2 \leq x \leq 1.8$), anti-perovskites (e.g $Li_3OHa$, where Ha=Cl, Br), and phosphates (e.g., $Li_{1-x}Al_xGe_{2-x}(PO_4)_3$ (LAGP), $Li_{1+x}Ti_{2-x}Al_x(PO_4)$). In various implementations, the plurality of inorganic particles include an oxide-based composition. In some embodiments, the plurality of inorganic particles include an sulfide-based composition. In various embodiments, the plurality of inorganic particles include an phosphate-based composition. In some implementations, the plurality of inorganic particles include a crystalline composition. In some embodiments, the plurality of inorganic particles include a partially crystalline composition. In some embodiments, the plurality of inorganic particles include an amorphous composition. In some implementations, the plurality of inorganic particles conduct lithium ions.

In some embodiments, the plurality of inorganic particles are coated with a protective layer including one or more materials selected from the group consisting of: aluminum oxide (Al2O3), zirconium oxide (ZrO2), and titanium dioxide (TiO2). In some embodiments, the protective layer is 0.5-10 nm. In various embodiments, the plurality of inorganic particles have a negative coefficient of thermal expansion. In some embodiments, an average diameter of the plurality of inorganic particles is between about 0.1-1 μm, about 1-5 μm, about 5-10 μm, or about 10-15 μm.

In various embodiments, the one or more polymers include one or more materials selected from the group consisting of: Polyoxymethylene (POM), Polybutylene terephthalate (PBT), Polypropylene (PP), Polyethylene (PE), Polyamide (PA), Polyetheretherketone (PEEK), Polyester (PET), Polytetrafluoroethylene (PTFE), Poly(vinyl chloride) (PVC), Poly(methyl methacrylate) (PMMA), Cellulose acetate (CA), Polyphenylene sulfide (PPS), Polyvinylidene fluoride (PVDF), Polyethylene oxide (PEO), Polysulfone (PSU), Polyurethane (PU), Polyamide-imide (PAI), Polyethersulfone (PESU), Polystyrene (PS), Polyetherimide (PEI), Acrylonitrile Butadiene Styrene (ABS), Polyimide (PI), and Polycarbonate (PC). In some embodiments, the one or more polymers are cross-linked. In some embodiments, the one or more polymers have a melting temperature of at most 180 C. In some implementations, the one or more polymers have a glass transition temperature of at most 180 C. In some embodiments, the one or more polymers do not include a metal salt. In various implementations, the electrolyte includes a non-ionically-conductive filler material.

In some embodiments, the thermally responsive composite is coated with a protective layer including one or more materials selected from the group consisting of: lithium phosphorous oxynitride (LiPON), aluminum oxide (Al2O3), zirconium oxide (ZrO2), and titanium dioxide (TiO2). In some embodiments, the thickness of the protective layer is 1-10 nm. In various embodiments, the weight percentage of polymeric material in the thermally responsive composite may be between 30-40 wt %.

In some embodiments, a response time of the thermally responsive composite is at least 1 second. In some implementations, a response time of the thermally responsive composite is at most 1 hour. In various embodiments, a thickness of the thermally responsive composite may be between 1-5 μm or 5-10 μm. In some embodiments, the thermally responsive composite is the main electrolyte of the battery.

In some implementations, the electrolyte further includes a primary electrolyte layer and wherein the thermally responsive composite is a shutdown separator layer between the primary electrolyte and one of the anode and the cathode. In various embodiments, the polymer matrix includes one or more crystalline or semicrystalline polymers that exhibit positive temperature coefficient behavior. In some embodiments, the polymer matrix includes one or more amorphous polymers that exhibit positive temperature coefficient behavior. In some embodiments, the polymer matrix includes one or more crystalline or semicrystalline polymers and one or more amorphous polymers. In various implementations, the polymer matrix includes one or more crystalline, semicrystalline, or amorphous polymers, and a polymer that exhibits no positive temperature coefficient behavior.

In another aspect of the embodiments herein, a battery is disclosed, the battery including: an anode; a cathode; and a thermally responsive composite layer disposed between the anode and the cathode, wherein the thermally responsive composite layer is configured to slow or disrupt the flow of ions between the anode and the cathode above a cutoff temperature. In some embodiments, the thermally responsive composite layer includes: a plurality of inorganic particles that are ionically conductive between the anode and the cathode, and one or more polymers that have a positive coefficient of thermal expansion. In some embodiments, the thermally responsive composite has decreased ionic conductivity above a cutoff temperature ($T_c$) between 60° C. and 180° C.

These and other features of the disclosed embodiments will be described in detail below with reference to the associated drawings.

BRIEF DESCRIPTION OF DRAWINGS

FIGS. 6-10 are diagrams of layers for a lithium ion battery according to various embodiments disclosed herein.

DETAILED DESCRIPTION

Figure 1:
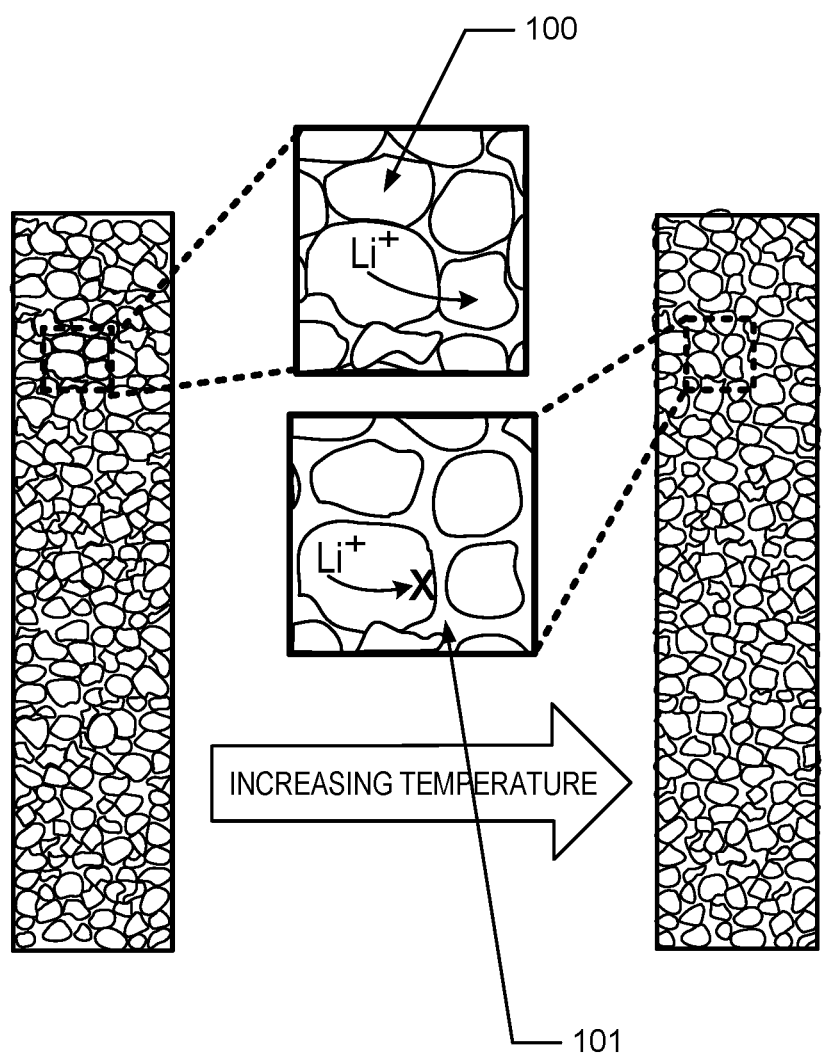
FIG. 1 presents an illustration of a thermally responsive electrolyte separator.

Particular embodiments of the subject matter described herein may have the following advantages. In some embodiments, lithium ion batteries having improved safety are provided. The batteries may include an electrolyte separator that is thermally responsive such that at high temperatures, the ionic conductivity of the separator drops, causing the flow of lithium ions to significantly slow or stop. In some embodiments, this provides a built-in safety mechanism that can simplify the design of commercial cells and systems.

In some embodiments, the ionically conductive solid-state compositions may be processed to a variety of shapes with easily scaled-up manufacturing techniques. The manufactured composites are compliant, allowing good adhesion to other components of a battery or other device. The solid-state compositions have high ionic conductivity, allowing the compositions to be used as electrolytes or electrode materials. In some embodiments, ionically conductive solid-state compositions enable the use of lithium metal anodes by resisting dendrites.

Liquid electrolytes typically used in lithium ion cells are volatile and flammable at high temperatures. For instance, 1,3-dioxolane (DOL) and dimethoxyethane (DME), two common liquid electrolyte components, have boiling points of 75° C. and 85° C., respectively. As such, replacement of liquid electrolytes with solid-state electrolyte may result in lithium ion cells that are substantially safer.

Further details of the ionically conductive solid-state compositions, solid-state electrolytes, electrodes, and batteries according to embodiments of the present invention are described below.

The ionically conductive solid-state compositions may be referred to as hybrid compositions herein. The term "hybrid" is used herein to describe a composite material including an inorganic phase and an organic phase. The term "composite" is used herein to describe a composite of an inorganic material and an organic material. The ionically conductive solid-state compositions may also be referred to as thermally responsive compositions, electrolytes, and/or separators. Generally, electrolytes facilitate the transfer of ions, while separators inhibit electrical or ionic short circuits. The composition described herein may fulfill one or both functions in a lithium ion battery.

Provided herein are thermally responsive compositions that include ionically conductive particles dispersed in polymer matrix that is substantially not ionically conductive and that exhibits positive temperature coefficient behavior. The non-ionically-conductive polymer matrix includes one or more polymers that may melt and/or thermally expand at high temperature. Below a cutoff temperature ($T_c$), the ionically conductive particles have intimate contact with each other, and ions may flow through the electrolyte by moving through the network of particles. In some embodiments, when the temperature of the composition rises beyond $T_c$, the one or more polymers expand in volume, which then causes the particles to separate and lose contact with each other. The separation of the ionically conductive particles causes the device's ionic resistivity to increase significantly (and, as more typically described, the ionic conductivity to decrease significantly), which decreases the flow of ions and inhibits thermal runaway. In some embodiments, one or more polymers may melt at or near $T_c$ and diffuse between ionically conductive particles, thus interfering with lithium ion conduction between particles.

In some embodiments, the polymer has a low ionic conductivity or substantially no ionic conductivity, for example a conductivity of less than 0.0001 mS/cm. The ionically conductive particles are proximate with each other at a temperature below the cutoff temperature of the separator, such that the conductivity of the separator is mostly defined by the conductivity of the particles. As the temperature of the separator rises above $T_e$ the ionically conductive particles lose contact with each other, and the particle-to-particle pathways for lithium ion conduction are disrupted. As a result, the ionic conductivity of the separator is mostly defined by the polymer, which may be several orders of magnitude lower than the particles.

As described further below, when the temperature of a thermally responsive composition rises above $T_c$, the ionic conductivity of the composition decreases. In some embodiments, the ionic conductivity of the composition at or above $T_c$ may be 50%, 10%, 1%, or 0.1% of the ionic conductivity below $T_c$.

FIG. 1 illustrates a thermally responsive electrolyte as disclosed herein. When the temperature is low, ionically conductive particles 100 are closely packed together and ions can move through the particles to cross the separator. When the temperatures increases above $T_c$, polymer 101 starts to expand and/or melt, requiring the ions to diffuse through the polymer. Ion flow is substantially stopped, as the polymer may have several orders of magnitude less ionic conductivity than the particles.

Figure 2A:
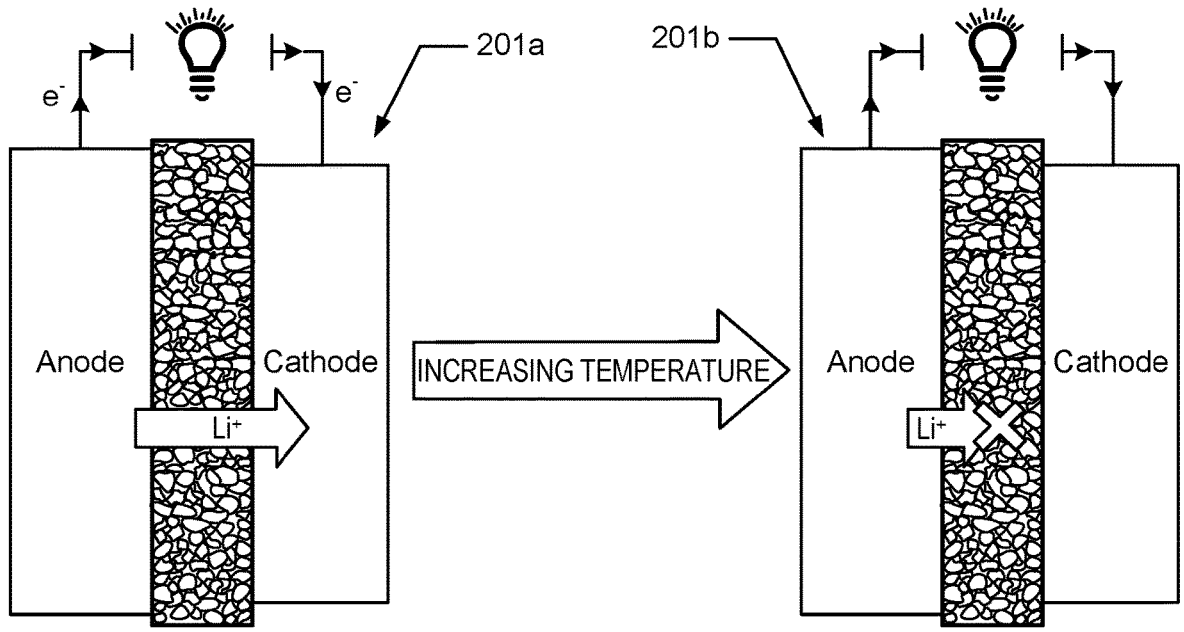
FIGS. 2A and 2B are illustrations of batteries that shut down to control thermal runaway.
Figure 2B:
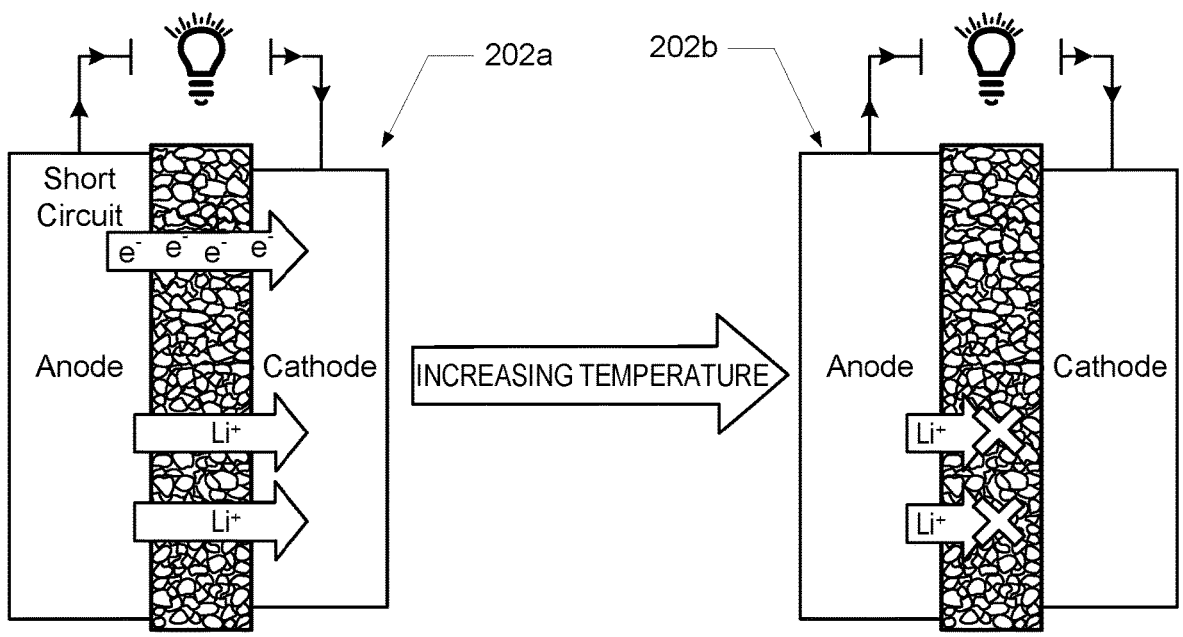

FIGS. 2A and 2B are representations of how a thermally responsive composition can be used in a lithium ion battery to prevent thermal runaway. In FIG. 2A, a lithium ion battery is used to supply power to a lightbulb in state 201a. In state 201b, the temperature has risen above $T_c$, causing the polymer to expand and/or melt, ions to stop flowing to the cathode, and electrons to stop powering the lightbulb. When the temperature reduces below $T_c$, the polymer may contract and ion flow, as well as electron flow, may resume.

FIG. 2B, a lithium ion battery cell has shorted, and electrons and lithium ions are able to freely move to a cathode in state 202a, causing an exothermic reaction that raises the temperature of the cell. In FIG. 2B, the electrons are travelling across the compromised electrolyte, but in some embodiments the electrons may flow through another path to reach the cathode, for instance during external short circuiting of the battery. Assuming there is no way to inhibit the flow of electrons, electrons and ions will continuously flow to the cathode and release heat, increasing the temperature of the battery. As the temperature exceeds $T_c$, one or more polymers will melt and/or expand and inhibit the flow of ions. Because the composition disclosed herein is limiting ion flow, electrons may still be able to freely flow towards the cathode. However, as the ions are substantially unable to flow to the cathode, the electrons may be unable to flow as well.

Figure 3:
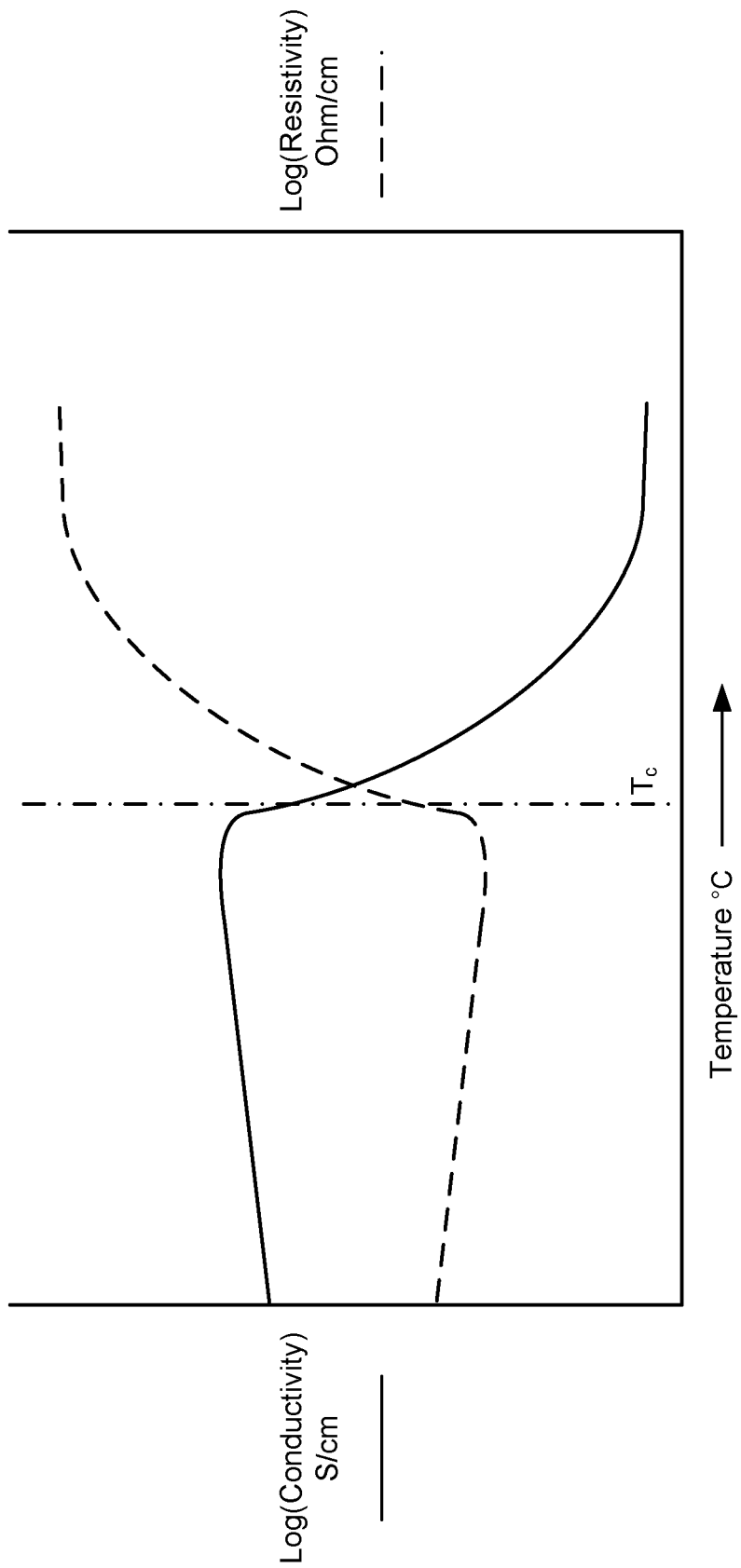
FIG. 3 presents a graph of ionic conductivity and ionic resistivity as a function of temperature for a composition as described herein.

FIG. 3 is a dual-sided graph provided to illustrate the conductivity and resistivity of a separator made of a thermally responsive composition as a function of temperature according to some embodiments described herein. Conductivity and resistivity are reciprocals of each other, and thus each curve follows a reciprocal path. In the middle of the graph is a vertical line representing $T_c$, the cutoff temperature. Above $T_c$, the ionic conductivity of the separator rapidly decreases, thus causing a substantial cessation of lithium ion flow across the separator.

The sharp change in conductivity at $T_c$ may be partially caused by a change in the physical characteristics of the polymer. In some embodiments the polymer exhibits a glass transition at a glass transition temperature $T_g$, which may be near $T_c$. In some embodiments the polymer exhibits a melting transition at a melting point temperature $T_m$, which may be near $T_c$. The glass transition and melting transition cause changes in the physical properties of the polymer, such as the density, morphology, crystallinity, and physical distribution of the polymer within the composite electrolyte. These changes in the polymer matrix significantly reduce the conduction of lithium ions between conductive particles, leading to a sharp change in conductivity that is apparent at $T_c$.

In some embodiments, more than one polymers are included in the separator. In such embodiments, there may be one or more $T_c$, such as a $T_{c1}$, $T_{c2}$, and $T_{cn}$, where the resistivity increases at each $T_{cn}$, along with one or more $T_{gn}$. Such compositions may be useful to control ion flow and temperature rise without causing a substantial shut down of the battery. For example, at $T_{c1}$ the battery may still provide limited power, but at $T_{c2}$ the battery shuts down.

In some embodiments, a notification may be sent or displayed indicating that the battery is overheating when the temperature nears or passes $T_c$. As the temperature rises beyond $T_c$ and the ionic conductivity rapidly decreases, the battery may shut down, which may stop the provision of power to a device connected to the battery. In some embodiments with multiple $T_c$, if the temperature passes $T_{c1}$, the ionic flow may reduce, but still be sufficient to power a connected device, which may trigger a circuit element to send or otherwise display a notification that the battery may be overheating. At $T_{c2}$, the ionic conductivity may drop sufficiently to shut down the device and prevent thermal runaway.

Below $T_c$, the ionic conductivity of the separator may remain relatively constant. In some embodiments, conductivity may increase up until immediately before $T_c$. In some embodiments, conductivity increases as temperature increases, and the increase in conductivity due to temperature overcomes any decrease in conductivity due to thermal expansion of the polymer below $T_c$. Conversely, in some embodiments the effect of thermal expansion outpaces the effect of thermal conductivity, and conductivity will slowly decrease until $T_c$, where a significant decrease in conductivity occurs. The effect of temperature on conductivity below $T_c$ depends on the choice of polymer and particle, and a combination of components may be chosen to control the conductivity below $T_c$.

Inorganic Phase

The inorganic phase of the composite materials described herein conducts alkali ions. In some embodiments, it is responsible for most or even substantially all of the ion conductivity of the composite material during normal operation, substantially all in this context being at least 99%, providing ionically conductive pathways through the composite material. In some embodiments, the inorganic phase is not electrically conductive, i.e. has an electrical conductivity of less than about $10^{-8}$ S/cm. The inorganic phase is not electrically conductive, such that electrons must flow through a circuit connected to a battery, rather than causing a short circuit where electrons may move between the anode and the cathode through the inorganic phase, leading to increased self-discharge.

In some embodiments, the inorganic phase is a particulate solid-state material that conducts alkali ions. In the examples given below, lithium ion conducting materials may be employed. Sodium ion conducting materials may also be employed. According to various embodiments, the materials may be glass particles, ceramic particles, or glass ceramic particles. The solid-state compositions described herein are not limited to a particular type of compound but may employ any solid-state inorganic ionically conductive particulate material, examples of which are given below.

In some embodiments, the inorganic material is a single ion conductor, which has a transference number close to unity. The transference number of an ion in an electrolyte is the fraction of total current carried in the electrolyte for the ion. Single-ion conductors have a transference number close to unity. According to various embodiments, the transference number of the inorganic phase of the solid electrolyte is at least 0.9 (for example, 0.99).

The inorganic phase may be an oxide-based composition, a sulfide-based composition, or a phosphate-based composition, and may be crystalline, partially crystalline, or amorphous. In certain embodiments, the inorganic phase may be doped to increase conductivity. Examples of solid lithium ion conducting materials include but are not limited to perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO_4$, $0 \leq x \leq 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga; $Li_{10}SnP_2S_{12}$), garnets (e.g., $Li_7La_3Zr_2O_{12}$, $Li_5La_3M_2O_{12}$, M is Ta or Nb); NASICON-type Li ion conductors (e.g., $Li_{1.3}Al_{0.3}Ti_{1.7}(PO_4)_3$), oxide glasses or glass ceramics (e.g., $Li_3BO_3$—$Li_2SO_4$, $Li_2O$—$P_2O_5$, $Li_2O$—$SiO_2$), sulfide glasses or glass ceramics (e.g., $75Li_2S$-$25P_2S_5$, $Li_2S$—$SiS_2$, $LiI$—$Li_2S$—$B_2S_3$), argyrodites (e.g., $Li_{7-x}PS_{6-x}Ha_x$, where Ha is Cl or Br, and $0.2 \leq x \leq 1.8$), anti-perovskites (e.g $Li_3OHa$, where Ha=Cl, Br), and phosphates (e.g., $Li_{1-x}Al_xGe_{2-x}(PO_4)_3$ (LAGP), $Li_{1+x}Ti_{2-x}Al_x(PO_4)$).

Additional examples of solid state electrolyte materials that may be used in the compositions are further provided in Gao et al., Adv. Mater. 2018, 30, 1705702; Manthiram et al., Nat. Rev. Mater. 2017, 2, 16103; and Bachman et al. Che. Rev. 2016, 116 (1), 140-162, incorporated by reference herein. In some embodiments, an inorganic phase may include more than one type of inorganic ionically conductive particle.

The particle size of the inorganic phase may vary according to the particular application, with an average diameter of the particles of the composition being between about 0.1-1000 μm. In some implementations, the average diameter of the particles of the inorganic material is between about 0.1-1 μm, 1-5 μm, 5-10 μm, 10-15 μm, 15-20 μm, 20-25 μm, 25-30 μm, 30-35 μm, 35-50 μm, 50-100 μm, or 100-1000 μm.

In some cases, the inorganic particles may be coated with a thin surface coating that protects the material from degradation within the battery cell, or degradation under conditions of air exposure, including those in commercial and manufacturing settings, for example in a dry room. Examples include but are not limited to aluminum oxide ($Al_2O_3$), zirconium oxide ($ZrO_2$), and titanium dioxide ($TiO_2$). The thickness of these protective coatings may be less than 1 nm, 1-10 nm, 10-20 nm, 20-30 nm, 40-50 nm, or 50-100 nm. In some embodiments, the thin film coatings improve particle-to-particle ionic conductivity. In some embodiments, the coatings are added to improve interaction with a lithium metal anode. In some embodiments, the coatings may improve the ability of conductive particles to separate and lose contact at $T_c$. For example, particles that include sulfide conductors may fuse together at relatively low pressures and temperatures compared to oxides. This can prevent particles from separating or inhibit polymer from flowing between particles at or after $T_c$. A coating of the surface of the particles (e.g. sulfidic particles) may alter their ability to fuse together. Preventing fusion enhances the ability of the particles to separate, which improves the thermal responsiveness of the electrolyte.

Polymer Matrix Composition

The disclosed composition can be any polymer that exhibits a positive coefficient of thermal expansion and is not ionically conductive, i.e. an ionic conductivity of less than 0.0001 mS/cm. In addition, as above, the polymer may also have an electrical conductivity less than $10^{-11}$ S/cm to reduce the rate of self-discharge and chances of a short circuit forming. Polymers that exhibit positive temperature coefficient behavior are commonly those that are crystalline or semi-crystalline below $T_m$, and less crystalline or not crystalline above $T_m$. Polymers that exhibit positive temperature coefficient behavior may also be those that are amorphous below $T_g$, and at or above $T_g$ undergo a glass transition to become more flexible, where molecular chains are more free to move around. Amorphous polymers, however, typically do not exhibit a clear melting point. Crystalline or semi-crystalline polymers have a regular structure with aligned molecular chains. Crystalline polymers typically do not exhibit a glass transition; they melt at $T_m$. Semi-crystalline polymers have characteristics of both amorphous and crystalline polymers, and may exhibit both a glass transition and melting point. Example polymers that exhibit this behavior are shown in the table below, along with their glass transition temperature ($T_g$) and melting temperature ($T_m$). As discussed above, $T_c$ for a given polymer may be similar to the glass transition or melting temperature of a material.

| Molecular Arrangement | Polymer | $T_g$ (° C.) | $T_m$ (° C.) |
|---|---|---|---|
| Crystalline | Polyoxymethylene (POM) | — | 185 |
| Crystalline | Polybutylene terephthalate (PBT) | — | 270 |
| Semi-crystalline | Polypropylene (PP) | −10 | 175 |
| Semi-crystalline | Polyethylene (PE) | −90 | 137 |
| Semi-crystalline | Polyamide (PA) | 50 | 215 |
| Semi-crystalline | Polyetheretherketone (PEEK) | 145 | 335 |
| Semi-crystalline | Polyester (PET) | 69 | 265 |
| Semi-crystalline | Polytetrafluoroethylene (PTFE) | −97 | 327 |
| Semi-crystalline | Poly(vinyl chloride) (PVC) | 87 | 212 |
| Semi-crystalline | Poly(methyl methacrylate) (PMMA) | 49 | 155 |
| Semi-crystalline | Cellulose acetate (CA) | 111 | 300 |
| Semi-crystalline | Polyphenylene sulfide (PPS) | 95 | 285 |
| Semi-crystalline | Polyvinylidene fluoride (PVDF) | −20 | 185 |
| Semi-crystalline | Polyethylene oxide (PEO) | −60 | 60 |
| Amorphous | Polysulfone (PSU) | 195 | — |
| Amorphous | Polyurethane (PU) | 160 | — |
| Amorphous | Polyamide-imide (PAI) | 280 | — |
| Amorphous | Polyethersulfone (PESU) | 220 | — |
| Amorphous | Polystyrene (PS) | 100 | — |
| Amorphous | Polyetherimide (PEI) | 218 | — |
| Amorphous | Acrylonitrile Butadiene Styrene (ABS) | 110 | — |
| Amorphous | Polyimide (PI) | 310 | — |
| Amorphous | Polycarbonate (PC) | 150 | — |

The polymer matrix that enables the positive temperature coefficient behavior of the electrolyte composition may contain one or more polymers that are crystalline, semi-crystalline, or amorphous. Examples of suitable polymers are provided in U.S. Pat. No. 4,237,441 (van Konynenburg et al.), U.S. Pat. No. 5,174,924 (Yamada et al.), U.S. Pat. No. (US 2008/0006796 A1, Khatua et al.), and U.S. Pat. No. (US 2016/0035468 A1, Lo et. A1), which are incorporated by reference for the purpose of providing suitable polymers to be used in the composition disclosed herein. Suitable polymers, in addition to the list above, may include polyolefins, e.g. polyethylene, polypropylene and ethylene/propylene copolymers; copolymers of one or more olefins, e.g. ethylene, with one or more polar copolymers, e.g. vinyl acetate, acrylic acid, ethyl acrylate and methyl acrylate; polyarylenes, e.g. poly arylene ether ketones and sulfones and polyphenylene sulfide; polyesters, including polyactones, e.g. polybutylene terephthalate, polyethylene terephthalate and polycaprolactone; polyamides; polycarbonates; and fluorocarbon polymers.

In some embodiments, the composition may contain a blend of polymers that may exhibit different glass transition and melting temperatures. Whenever reference is made to singular polymers in this application, it should be understood that a blend of polymers may also be used. In some embodiments, the polymers may have melting temperatures and/or glass transition temperatures that are substantially different, such that the blend of polymers exhibits multiple changes in physical properties based on the melting and/or glass transition temperature of each polymer in the blend. This may be advantageous to provide a gradual reduction in ionic conductivity, which may result in temperature stabilization without requiring a total shutdown of the battery. This may also be advantageous to mitigate irreversible changes to the inherent shape of the composite electrolyte separator film that may occur when a low $T_m$ polymer is significantly melted and flows outward. For example, one or more polymers having a high $T_g$ or $T_m$ may be paired with one or more polymers that have substantially lower $T_m$. The low $T_m$ polymer enables the positive temperature coefficient behavior, while the high $T_g$ and $T_m$ polymer mitigates change to the film integrity.

Figure 4:
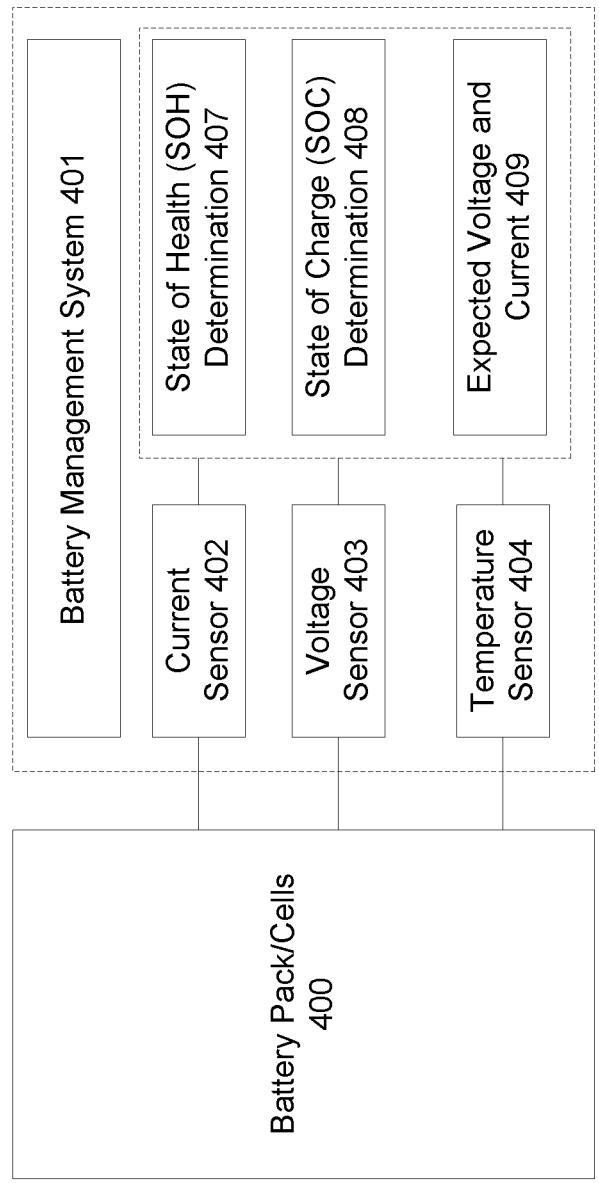
FIG. 4 presents a system diagram of a battery management system.
Figure 5:
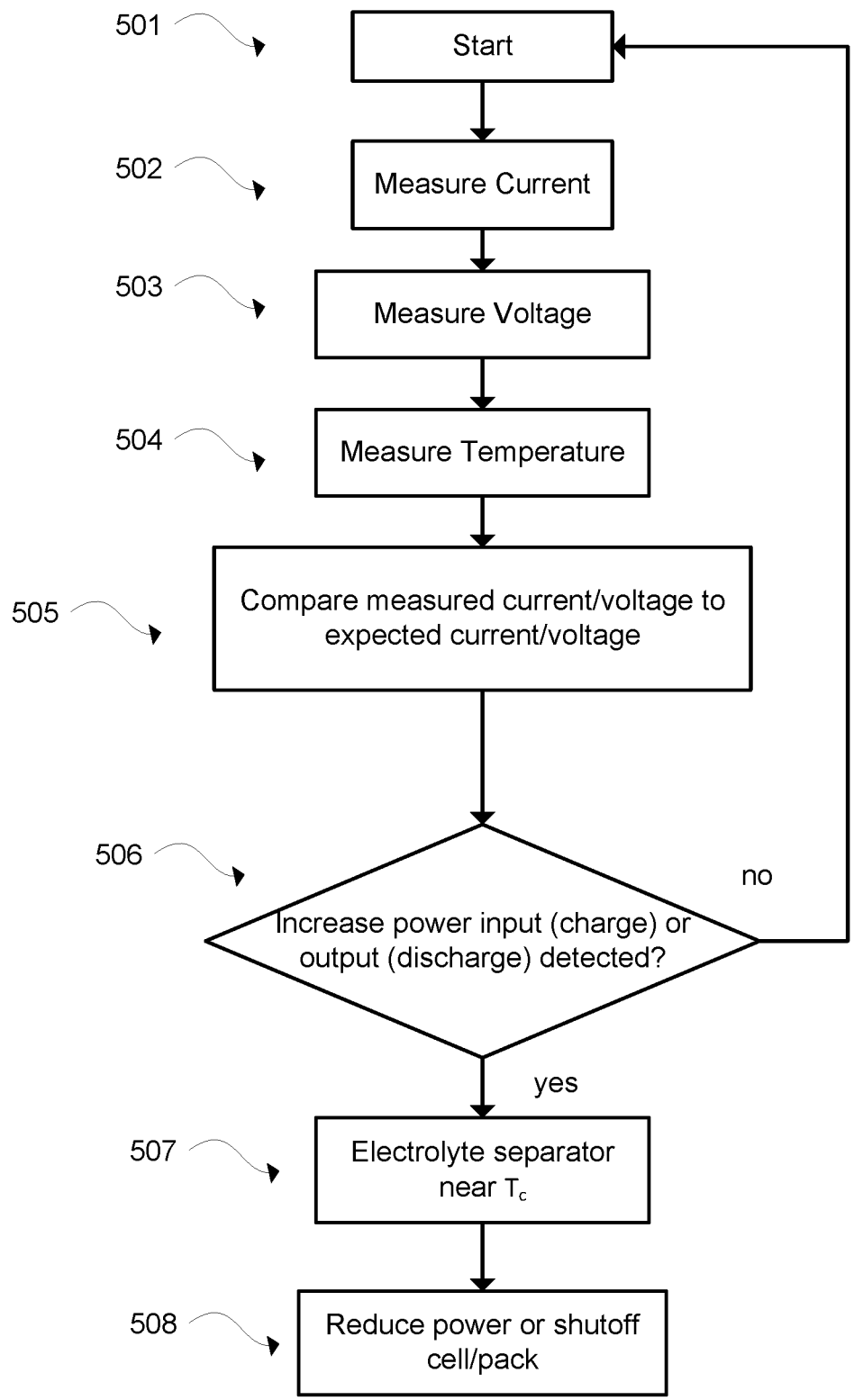
FIG. 5 presents a process flowchart according to various embodiments disclosed herein.

Furthermore, different melting temperatures and/or glass transition temperatures may be advantageous to decrease the response time of the composition (as discussed further below) or to provide an initial decrease in ionic conductivity without a complete shutdown of the battery. In such embodiments the battery may provide reduced power during discharge, or a higher power during charge, that is detectable by a battery management system (for example as shown in FIG. 4). After detecting the increase or decrease in power during discharge or charge, the battery management system may reduce the power to or from the battery pack or cells, or shut off power to or from the battery pack or cells to maintain safety (for example as shown in FIG. 5).

In some embodiments, the ionic conductivity of the thermally responsive separator may increase after surpassing Tc, for instance if the battery cell is under pressure. In some embodiments, as a result of pressure, a polymer that has surpassed Tc may melt and be pushed outward, flowing to the exterior of the cell stack. This may allow inorganic electrolyte particles within the composite separator to be pressed together, having improved contact and leading to an increase in ionic conductivity. As a result, the power output during discharge would be higher, and the power input to charge the cell would be lower. After detecting the increase or decrease in power during discharge or charge, a battery management system may reduce the power to or from the battery pack or cells, or shut off power to or from the battery pack or cells to maintain safety (for example as shown in FIG. 5).

In some embodiments, the composition may contain a polymer that has a positive coefficient of thermal expansion at $T_c$, but does not melt at $T_c$, e.g., an amorphous or semi-crystalline polymer. This may be advantageous to reduce ionic conductivity as temperature increases near or above $T_c$ with a reduced risk of the polymer being pushed outwards and allowing inorganic electrolyte particles to press together, which may then increase ionic conductivity.

In some embodiments, the composition may contain a blend of polymers, such as block copolymers, where one polymer exhibits melting at $T_c$, e.g., a crystalline or semi-crystalline polymer, while another polymer does not melt at $T_c$, e.g., an amorphous polymer. This may be advantageous in that one polymer may exhibit a positive temperature coefficient at $T_c$, reducing ionic conductivity, while another polymer provides structural rigidity to the composition. For example, a first polymer of the composition may have a positive temperature coefficient but may also melt and move towards the exterior of the cell stack at $T_c$, allowing the inorganic particles to press together. A second polymer of the composition may counterbalance that effect by not melting nor exhibiting a glass transition at $T_c$ that would allow for the melted polymer portion of the composition to substantially move. In some embodiments, the second polymer may or may not exhibit a positive temperature coefficient or exhibit a phase transition at or near $T_c$.

In some embodiments, the composition contains a polymer that melts at or near $T_c$, but the polymer is inhibited from being pushed out of the cell. For example, a barrier layer may be formed around each battery cell, inhibiting the polymer composition from flowing out and thus inhibiting the inorganic particles from being pressed together. In some embodiments the barrier layer may be an epoxy, polymer, or other layer that does substantially does not expand with rising temperature. If the barrier layer expanded with rising temperature, it may create a void that the polymer could be pushed towards as it melts.

In some embodiments, the composition contains a polymer that is crosslinked. In some embodiments, the polymer is crosslinked prior to formation of a film containing the composition. In some embodiments, the polymer is crosslinked during the formation of a film containing the composition.

In some embodiments, the composition may contain one or more thermoplastics, including polyolefins such as polyethylene, olefin polymer such as ethylene-vinyl acetate copolymer and ethylene-acrylic acid copolymer, halogenated polymer, polyamide, polystyrene, polyacrylonitrile, polyethylene oxide, polyacetal, thermoplastic modified celluloses, polysulfone, thermoplastic polyester such as PET, poly(ethyl acrylate), poly(methyl methacrylate), and thermoplastic elastomer. Additional examples include high-density polyethylene (HDPE), low-density polyethylene (LDPE), medium-density polyethylene, ethylene-ethyl acrylate copolymer, ethylene-vinyl acetate copolymer, ethylene-acrylic acid copolymer, poly(vinylidene fluoride), styrene-ethylene-butylene-styrene copolymers, styrene-butadiene-styrene copolymers, and vinylidene fluoride-tetrafluoroethylene-hexafluoropropylene copolymer.

The thermoplastic may be paired with a thermoset that may or may not exhibit a thermal response at Tc, such as epoxy resin, unsaturated polyester resin, polyimide, polyurethane, phenolic resin, silicone resin. Epoxy resins are oligomers having reactive epoxy end groups (with a molecular weight of several hundred to several ten thousand) cured or crosslinked with various curing agents, and are generally divided into glycidyl ether type (as typified by bisphenol A), glycidyl ester type, glycidyl amine type and alicyclic type. In certain applications, trifunctional or multi-functional epoxy resins may be used. The curing agents are divided into addition polymerization, catalyst and condensation types, depending on the reaction mechanism. Curing agents of the addition polymerization type themselves add on epoxy or hydroxyl groups, and include polyamines, acid anhydrides, polyphenols, polymercaptans and isocyanates. Catalyst type curing agents are to catalyze polymerization between epoxy groups and include tertiary amines and imidazoles. Curing agents of the condensation type achieve curing through condensation with hydroxyl groups and include phenolic resins and melamine resins.

In some embodiments, the composition may contain low-molecular weight organic compounds such as waxes, oils, and fats that may lower the value of $T_c$, and improve the ability of the composition to undergo thermal shutdown with a lower amount of non-ionically conductive particulate material. The size of the low-molecular weight organic compound may vary. Examples of sizes range from about 500 g/mol to about 50,000 g/mol. In some embodiments, the size of the polymer ranges from about 500 g/mol to 40,000 g/mol, or from 500 g/mol to 25,000 g/mol. In some embodiments, the low-molecular weight organic compound is a long-chain alkane ($C_nH_{2n+2}$). In particular, paraffin oils and waxes may be used. Paraffin waxes are mixtures of long-chain alkanes $C_nH_{2n+2}$ having n between 20 and 40. Paraffin oils are smaller, having fewer than twenty carbons. While smaller paraffin oils may be too volatile, larger paraffin oils (e.g., n=17) may be suitable for use. Branched alkanes may also be used. For example, a paraffin wax may be modified by the addition of one or branches off the long-chain alkanes a mixture. Example melting points for paraffin wax are between about 46° C. and 68° C. Paraffin oils are liquid at room temperature.

In some embodiments, a polymer or low-molecular weight organic component that undergoes a thermal transition may subsequently coat the surface of the inorganic particle surface. In some embodiments, this coating mechanism will increase the thermal response of the composition, and may protect the inorganic particles from thermal events that could take place subsequently. For example, the coating of an inorganic sulfide-based lithium ion conductor by the polymer or low molecular weight organic component could prevent exothermic degradation of the sulfide-based conductor. It may also prevent generation of hydrogen sulfide gas in the scenario that the composition is exposed to air, for instance if the battery cell casing was damaged or punctured.

In some embodiments, one polymer may be thermally responsive at a given $T_c$, while one or more other polymers do not exhibit a notable change in physical or chemical properties at $T_c$.

In some embodiments, the polymer has a high polarity, for instance when polar functional groups of the polymer have an affinity to the surface of the inorganic particle. This may enhance the ability of the polymer to coat the inorganic particle surface and improve the thermal responsiveness of the composition.

In some embodiments, shell-core bicomponent fibers or particles, in which the shell is a non-polar (non-ionically-conductive polymer such as polypropylene (PP), polyethylene (PE), polystyrene (PS), etc.) that melts at high temperature and the core is a polar polymer (such as polyethylene oxide (PEO), nylon, polyester (PET), etc.), may be used. These materials would allow for two different interactions with the ion conductive inorganic particles depending on the cutoff temperature ($T_c$): non-polar interactions with the inorganic particles below cutoff temperature ($T_c$) of the polymer shell, and polar interactions with the inorganic particles beyond cutoff temperature ($T_c$) of the polymer shell. Therefore, the ionic resistivity of the hybrid material and solvent selection are influenced by the nonpolar shell, as the polar core is encapsulated.

This may be particularly beneficial for embodiments where sulfide-based inorganic particles are used. Generally speaking, these materials exhibit drops in performance (i.e. conductivity) when exposed to polar solvents and molecules. As such, it is preferable that they be combined with non-polar solvents during processing, and non-polar polymers when employed in a polymer-inorganic conductor. The non-polar shell of the shell-core bicomponent fibers and particles does not inhibit the inorganic sulfidic materials during processing and when implemented into a composite electrolyte. Above $T_c$, the non-polar polymer shell melts (and in some embodiments may also expands), which allows for the polar, polymer core to interact with the ion conductive inorganic phase. The polar polymers may encapsulate the inorganic particles, leading to an ionically-insulative coating on the surface of the inorganic particles that generates a significant increase of the ionic resistivity of the composition and prevents thermal runaway.

In general, the polymer matrix is not ionically conductive, or has a very low ionic conductivity. The ionic conductivity of the composition becomes more dependent on the conductivity of the polymer portion above $T_c$, as the expansion and/or melting of the polymer forces ions to conduct through the polymer rather than the inorganic particles. The ionic conductivity of the polymer is low enough to ensure that ionic flow stops and the temperature stabilizes above $T_c$.

While polymers that are substantially non-ionically-conductive may be used in some embodiments, in some other embodiments, the polymer, or at least one polymer in a blend of polymers, has a higher ionic conductivity, such as between 0.0001-0.001 mS/cm. A higher ionic conductivity will increase the composite conductivity of the composition, which is advantageous to the operation of the battery. The increased ionic conductivity may still be offset by the thermal expansion and/or melting of the polymer above $T_c$, such that the temperature stabilizes without irreversible damage to the battery or catastrophic failure.

Composition

The weight percentage of polymeric material in the electrolyte composition may be between 1-10 wt %, 10-20 wt %, 20-30 wt %, 30-40 wt %, 40-50 wt %, 50-60 wt %, 60-70 wt %, 70-80 wt %, 80-90 wt %, or 90-99 wt % of the electrolyte composition The remaining weight percentage may be the inorganic particles, and may be between 1-10 wt %, 10-20 wt %, 20-30 wt %, 30-40 wt %, 40-50 wt %, 50-60 wt %, 60-70 wt %, 70-80 wt %, or 80-90 wt %.

In some embodiments, the thermally responsive composition may contain additional filler materials that are substantially non-ionically conductive. In some embodiments a filler material may be between 1-5 wt %, 5-10 wt %, 10-20 wt %, 20-30 wt %, or 30-50 wt % of the composition. While adding ionically conductive material, such as metal salts, to the polymer would generally increase the ionic conductivity of the composition, it may also negate the thermally responsive nature of the composition by increasing the ionic conductivity of the organic phase. As noted above, the polymer should have a low ionic conductivity in order to shut down the circuit above $T_c$. Filler materials may be added to improve the manufacturability of the film, the mechanical properties of the film, reduce the porosity of the film, or improve an aspect related to the thermal response of the electrolyte composition. Such aspects may include the cutoff temperature and the response time of the composition. In some embodiments, and in particular when sulfidic materials are used, the composition may contain an additional additive that is used to absorb hydrogen sulfide gas (e.g. ZnO).

The cutoff temperature $T_c$ is defined as the temperature at which the slope of the resistance of the electrolyte composition sharply increases. $T_c$ for the electrolyte composition may be between about 60-350° C., between about 60-180° C., or between about 80-150° C. $T_c$ of the film may be specifically engineered by choice of inorganic and polymer composition. $T_c$ may be specifically designed to be below the temperature at which point exothermic reactions in the battery begin (e.g., the temperature at which point the solid electrolyte interphase (SEI) of the electrode active materials begins to breakdown). The cutoff temperature may importantly be below the point at which electrode active materials begin to decompose to produce gaseous species. In some embodiments, $T_c$ is designed so that a stabilized temperature is below the temperature where other components in the battery decompose or otherwise breakdown. A stabilized temperature is a temperature where the heat generated by the battery is equal to the ability of the battery to dissipate heat, i.e. heat generated or caused by ionic flow is in thermal equilibrium with the battery's ability to cool down.

The response time for the composition is defined as the time it takes for the resistance of the composition to increase from its initial resistance right below $T_c$ to its final resistance right above $T_c$. In some embodiments, the response time of the separator is designed to be fast, or at least 1 sec, such that the electrolyte resistance increases abruptly. This may be favorable when $T_c$ is significantly higher than the expected operating temperature range for the composition. In some embodiments, the response time of the electrolyte composition is designed to be slow, or at most 1 hr, such that the electrolyte resistance increases slowly. This may be favorable when $T_c$ is close to the expected operating temperature range of the composition. Otherwise, when the battery temperature comes into proximity of $T_c$, 'false triggering' of thermal shutdown may occur, which is undesirable.

In some embodiments, the original ionic conductivity of the composition may be regained after the temperature of the composition increases above $T_c$ by reducing the temperature of the composition to a value below $T_c$. In some embodiments, after the separator has passed the cutoff temperature and cooled down, the original ionic conductivity may be regained by compressing the separator or cell under a high pressure. Thus, the separator may act as a resettable fuse. This is particularly advantageous in scenarios where one may want to reuse the cell. In some embodiments the ionic conductivity below $T_c$ of the composition after passing $T_c$ may be at least about 50%, 60%, 70%, or 80% of the original conductivity, before any processing to increase ionic conductivity.

The overall thickness of the thermally responsive composite may be between 0.1-1 μm, 1-5 μm, 5-10 μm, 10-15 μm, 15-20 μm, 20-25 μm, 25-30 μm, 30-35 μm, 35-50 μm, 50-100 μm, or 100-1000 μm.

Battery Management System

FIG. 4 illustrates a battery management system 401 that may be used with a battery cell or pack 400. A battery management system may perform various functions for a battery cell or battery pack comprising multiple battery cells, e.g., monitoring the state of the battery pack or cells, determining various conditions of the battery cells/pack, and controlling the battery pack or cells, such as balancing cells or protecting the battery pack or cells from under- or over-current, voltage, or temperature. In some embodiments, a battery pack 400 includes one or more cells that are fabricated to include an electrolyte as described herein. Various battery cells and their fabrication/composition are described elsewhere herein. A battery management system 401 may have various components, including a current sensor 402, a voltage sensor 403, and a temperature sensor 404. In some embodiments, there may be a single battery management system for each battery cell or a single battery management system for multiple battery cells, e.g., a pack of battery cells.

Battery management system 401 may also comprise logic or subsystems for determining a state of health (SOH) 407 for each battery cell or battery pack. SOH generally refers to the condition of a battery compared to ideal conditions and may be expressed as a percentage. SOH may be determined in various ways as understood by a person having skill in the art.

Battery management system 401 may also comprise logic or subsystems for determining a state of charge (SOC) 408 for each battery cell or battery pack. SOC generally refers to the current charge of the battery and may be expressed as a percentage. SOC may be determined in various ways as understood by a person having skill in the art.

Battery management system 401 may also comprise logic or subsystems for determining an expected voltage and/or current 409 of the battery cell or pack. In some embodiments, the expected voltage and/or current 409 may be determined by various means, and may be based on the temperature, SOH, and/or SOC of the battery cell or pack, as understood by a person having skill in the art.

FIG. 5 provides an example process flowchart that may be performed by a battery management system, such as battery management system 401 for the battery cell(s) or pack(s) it controls. The process flowchart starts at operation 501. In operation 502, a current of the battery is measured. It should be understood that a battery may refer to one or more cells or a battery pack. In operation 503, a voltage of the battery is measured. In operation 504, a temperature of the battery is measured. In various embodiments, the order of operations 502-504 may be different.

In operation 505, an expected current/voltage is compared against the measured current/voltage. In operation 506, it is determined whether the power input/output of the battery (as may be determined based on the measured voltage and current), compared to the expected power of the battery (as may be determined based on the expected voltage and current) exceeds a threshold value. It should be understood that during discharge, the measured power is an output of the battery, while during charge, the measured power is an input to the battery. If the difference of the measured power compared to the expected power does not exceed the threshold value, the process returns to operation 501, and operations 501-506 may be repeated one or more times.

If the difference does exceed the threshold value, then the process proceeds to operation 507, where the measured temperature of the battery is compared to a $T_c$ value of the battery. As noted herein, $T_c$ may be one of one or more cutoff temperatures where the ionic conductivity of the battery may change, i.e. increase or decrease. If the measured temperature of the battery is near $T_c$ or exceeds $T_c$, power flowing to the battery is reduced or shutoff in operation 508. In some embodiments, power may be reduced or shutoff if the measured temperature of the battery is within about 10° C., 5° C., 3° C., or 1° C. of $T_c$, or if the measured temperature is at or exceeds $T_c$. For example, the battery management system may determine, based on the measured temperature and $T_c$, that the battery is at an increased risk of or is undergoing thermal runaway. In some embodiments, the battery management system may then provide a notification or record in a memory that the battery's power was reduced or shutoff. In some embodiments, the battery management system may continue to monitor the temperature of the battery and increase power to the battery when the temperature of the battery is below $T_c$.

Fabrication

There are many different ways to form the composition. In some implementations, the inorganic material and polymer may be mixed together and extruded to form films. The extruded film may then be implemented into a battery cell via lamination to one or both of the electrodes, or as a free standing film that the electrodes are compressed and/or laminated to.

In some embodiments, the polymer and inorganic material are added to a solvent and a slurry is prepared. The slurry may then be cast to form a film of the polymer and inorganic that is then dried to remove the slurry solvent. In some embodiments, the slurry may be cast directly on to a battery electrode. In some embodiments, the slurry may be cast on to a release film, preparing a free-standing film of the proposed composition. In some embodiments, the dried film is then implemented into a battery via a lamination technique, for instance using a calender roll press, or an isotactic vertical heat press to transfer the film to one or both of the electrodes. In some embodiments, the dried, slurry-cast film is implemented as a free standing film that the electrodes are compressed and or laminated to.

In some embodiments, the film is compressed (i.e. densified) before implementation into the cell. In some embodiments, the film is heat treated prior to implementation into the battery. In some embodiments, the film is compressed and heat treated simultaneously prior to or during implementation into the battery. The heat treatment and compressive forces may be used to increase the conductivity of the film, or cause a chemical reaction to take place (such as crosslinking of the polymer matrix). The heat treatment and compressive forces may be used to 'lock in' the composition into a physical state wherein the particles are compressed together, such that the ionic conductivity for the film is higher than it was before compression. In this case, it is important not to release compressive forces on the film until the temperature of the film or heating apparatus is below the $T_g$ or $T_m$ of the polymer to allow the polymer to 'fix' the particles in place when the temperature is below $T_c$.

In some embodiments, the proposed composition may be implemented on to another film that is used as an electrolyte within the battery. For example, the composition may be implemented onto one or both sides of a porous polymeric separator and used in a traditional lithium ion battery with a liquid electrolyte. The composition may be cast on one or both sides of a polymer electrolyte separator. The composition may be cast on one or both sides of a fully inorganic electrolyte separator. The composition may be cast on one or both sides of a composite electrolyte separator that may have a composition different than that of the composition being cast on one or both sides of the separator. For instance, a highly conductive separator with a thickness of 20 μm can be used, with a 5 μm shutdown electrolyte composition as described herein cast on top of it. In some embodiments, the composition of the thermally responsive composition may be substantially non-porous and impermeable to liquid electrolyte, which in this context means liquid electrolyte will not pass through the composition during normal use of the composition as discussed herein.

In some embodiments, a film containing the proposed composition may be coated with a thin surface coating that protects the material from degradation within the battery cell, or degradation under conditions of air exposure, including those in commercial and manufacturing settings, for example in a dry room. This coating may also be used to prevent and/or mitigate the growth of lithium dendrites. Examples include but are not limited to lithium phosphorous oxynitride (LiPON), aluminum oxide, zirconium oxide, and titanium oxide. The thickness of these protective coatings may be less <1 nm, 1-10 nm, 10-20 nm, 20-30 nm, 40-50 nm, or 50-100 nm.

FIG. 6 shows an example of a schematic of a cell 100 according to certain embodiments of the invention. The cell 100 includes a negative current collector 102, an anode 104, an electrolyte/separator 106, a cathode 108, and a positive current collector 110. The negative current collector 102 and the positive current collector 110 may be any appropriate electronically conductive material, such as copper, steel, gold, platinum, aluminum, and nickel. In some embodiments, the negative current collector 102 is copper and the positive current collector 110 is aluminum. The current collectors may be in any appropriate form, such as a sheet, foil, a mesh, a textured foil, a metallic foil coated in carbon, or a foam. According to various embodiments, one or more of the anode 104, the cathode 108, and the electrolyte/separator 106 is a solid-state composite including a composition as described above. FIG. 7 shows an example of schematic of a lithium metal cell as-assembled 200 according to certain embodiments of the invention. The cell as-assembled 200 includes a negative current collector 102, an electrolyte/separator 106, a cathode 108, and a positive current collector 110. Lithium metal is generated on first charge and plates on the negative current collector 102 to form the anode.

In some embodiments, the electrolyte/separator is the main electrolyte of the battery and comprises a thermally responsive composition as described herein, such that there is not a distinguishably separate electrolyte from the thermally responsive composition. In such embodiments, the thermally responsive composition provides the functions of a shutdown separator, which causes the battery to have substantially decreased ionic conductivity above $T_c$, and the electrolyte, which facilitates the transfer of ions between the anode and the cathode.

FIG. 8 shows an example of a schematic of a cell 100 according to certain embodiments of the invention. The cell 100 includes a negative current collector 102, an anode 104, a shutdown separator 105 (using the thermally responsive composition described herein), a separate electrolyte (or primary electrolyte) 107, a cathode 108, and a positive current collector 110. The shutdown separator is positioned between the anode and the primary electrolyte, but may also be positioned between the primary electrolyte and the cathode. FIG. 9 shows an example of a schematic of a cell where the shutdown separator is between the electrolyte and the cathode.

The electrolyte (or primary electrolyte) 107 may be, for example, a traditional lithium ion battery separator that is porous and contains a liquid electrolyte; a solid polymer electrolyte containing no liquid electrolyte; a fully inorganic glass, ceramic, or glass ceramic electrolyte; a composite electrolyte containing a polymer electrolyte and inorganic electrolyte; or a composite electrolyte containing a non-conducting polymer paired with an inorganic electrolyte.

The shutdown separator also functions as an electrolyte (by facilitating the transfer of ions), but the primary electrolyte may have a different composition or conductivity than the shutdown separator. For example, the primary electrolyte may have increased ionic conductivity compared to the shutdown separator, such that the ionic conductivity between the anode and the cathode is greater than if an electrolyte layer was mostly the thermally responsive composition, such as described above. In some embodiments there are multiple shutdown separators, with one positioned between the anode and the electrolyte and the another positioned between the cathode and the electrolyte, sandwiching the electrolyte between two shutdown separators. In other embodiments the primary electrolyte and the thermally responsive composition may be alternatively layered, forming a stack of one or more primary electrolyte and one or more thermally responsive composition between the anode and the cathode. In embodiments where there is one or more primary electrolyte layers and one or more thermally responsive layers, the primary electrolyte layer(s) may be 5-25 μm thick, while the thermally responsive layer(s) may be 0.5-15 μm thick.

In some embodiments, such as shown in FIG. 10, the shutdown separator may be positioned between two primary electrolytes. This may be desirable for use with liquid electrolytes, where the advantage of higher ionic conductivity of liquid electrolytes can be used with a separator that is less prone to failure and thermal runaway as well as being reusable after the temperature exceeds $T_c$ and triggers a shutdown.

In embodiments where the primary electrolyte is a separate layer from the shutdown separator, the primary electrolyte may or may not comprise a thermally responsive composition as described herein. In such embodiments, the shutdown separator may be a thinner film than the electrolyte, for example between 0.5 and 15 µm. This may be desirable because the electrolyte may have a higher ionic conductivity than the compositions described herein, while the shutdown separator provides the safety advantages of the compositions described herein.

In some embodiments, the battery is connected to a controller or logic device that controls the operation of the battery. The controller may be able to control various aspects of the battery, as well as send notifications or instructions to a device connected to the battery. In some embodiments, the controller may instruct the device to shut down because the battery temperature has exceeded $T_c$. In some embodiments, the thermal response characteristics of the electrolyte composition and cell provide an indicator that a logic device can make use of. For example, the voltage required to charge the cell will be higher than expected when the ionic conductivity of the electrolyte composition decreases as a result of a thermal response. In some embodiments, the battery cells with a battery pack or a cell may have a certain pressure applied to compress the cells during operation, which may improve ionic conductivity of the cell. This pressure may inhibit the thermal expansion of the separator, which is undesirable, and the controller may cause a release of pressure on the cell to allow the separator to expand and shut down the battery.

All components of the battery can be included in or packaged in a suitable rigid or flexible container with external leads or contacts for establishing an electrical connection to the anode and cathode, in accordance with known techniques.

CONCLUSION

In the description above and in the claims, numerical ranges are inclusive of the end points of the range. For example, "an average diameter between 0.1 µm and 500 µm," includes 0.1 µm and 500 µm. Similarly, ranges represented by a dash (e.g., 50%-99%) are inclusive of the end points of the ranges. The terms "non-conductive", "substantially non-conductive", or "substantially stopped" may be used herein in reference to electron or ion flow, and it will be appreciated that such terms encompass a minimal amount of conduction rather than no conduction. All batteries exhibit some amount of self-discharge, and the terms above should not be construed to require no conductivity.

In the description above the composition is generally described as limiting ion flow from the anode to the cathode during discharge. It should be appreciated, however, that the composition will function similarly in reverse; when charging a lithium ion battery, ion flow may substantially stop when temperature exceeds $T_c$. Furthermore, $T_c$, $T_m$, and $T_g$ are described herein as a single temperature value, though it should be appreciated that in practice such temperatures and the physical phenomena associated with such temperatures as described herein may operate over a range of ±5° C.

In the description above various properties, such as ionic conductivity or thickness, may change as a function of temperature. Values provided for temperature dependent properties are at room temperature, though it should be appreciated such values may change as a function of temperature. Such properties may predictably change as a function of temperature.

The foregoing describes the instant invention and its certain embodiments. Numerous modifications and variations in the practice of this invention are expected to occur to those skilled in the art. For example, while the above specification describes electrolytes and electrodes for alkali ion or alkali metal batteries, the compositions described may be used in other contexts. For example, in capacitors, or solid oxide fuel cells. Further, the batteries and battery components described herein are no limited to particular cell designs. Such modifications and variations are encompassed within the following claims.

The invention claimed is:

1. A battery, comprising:
  an anode layer comprising anode active material;
  a cathode layer comprising cathode active material; and
  an electrolyte positioned between the anode layer and the cathode layer, the electrolyte comprising:
    a primary electrolyte layer comprising an inorganic phase that is ionically conductive and a polymer matrix that consists essentially of one or more non-ionically conductive polymers, and
    a thermally responsive composite layer comprising:
      a plurality of inorganic particles that are ionically conductive between the anode layer and the cathode layer, and
      one or more polymers that have a positive coefficient of thermal expansion and are not ionically conductive, wherein the electrolyte has a first ionic conductivity below a cutoff temperature ($T_c$), and a second ionic conductivity that is lower than the first ionic conductivity at or above $T_c$, wherein $T_c$ is between 60° C. and 180° C., wherein the thermally responsive composite is a shutdown separator layer between the primary electrolyte layer and one of the anode layer and the cathode layer, wherein below $T_c$ the plurality of inorganic particles contact each other and the ionic conductivity of the thermally responsive composite layer is mostly defined by the ionic conductivity of the plurality of inorganic particles, and wherein above $T_c$ the one or more polymers expand in volume such that the ionic conductivity is defined mostly by the one or more polymers.

2. The battery of claim 1, wherein the plurality of inorganic particles include one or more materials selected from the group consisting of: perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO_4$, $0 \leq x \leq 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga; $Li_{10}SnP_2S_{12}$), garnets (e.g. $Li_7La_3Zr_2O_{12}$, $Li_5La_3M_2O_{12}$, M is Ta or Nb); NASICON-type Li ion conductors (e.g., $Li_{1.3}Al_{0.3}Ti_{1.7}(PO_4)_3$), oxide glasses or glass ceramics (e.g., $Li_3BO_3$—$Li_2SO_4$, $Li_2O$—$P_2O_5$, $Li_2O$—$SiO_2$), sulfide glasses or glass ceramics (e.g., $75Li_2S$-$25P_2S_5$, $Li_2S$—$SiS_2$, $LiI$—$Li_2S$—$B_2S_3$), argyrodites (e.g. $Li_{7-x}PS_{6-x}Ha_x$, where Ha is Cl or Br, and $0.2 \leq x \leq 1.8$), anti-perovskites (e.g $Li_3OHa$, where Ha=Cl, Br), and phosphates (e.g., $Li_{1-x}Al_xGe_{2-x}(PO_4)_3$ (LAGP), $Li_{1+x}Ti_{2-x}Al_x(PO_4)$).

3. The battery of claim 1, wherein the plurality of inorganic particles conduct lithium ions.

4. The battery of claim 1, wherein the plurality of inorganic particles have a negative coefficient of thermal expansion.

5. The battery of claim 1, wherein the one or more polymers include one or more materials selected from the group consisting of: Polyoxymethylene (POM), Polybutylene terephthalate (PBT), Polypropylene (PP), Polyethylene (PE), Polyamide (PA), Polyetheretherketone (PEEK), Polyester (PET), Polytetrafluoroethylene (PTFE), Poly(vinyl chloride) (PVC), Poly(methyl methacrylate) (PMMA), Cellulose acetate (CA), Polyphenylene sulfide (PPS), Polyvinylidene fluoride (PVDF), Polyethylene oxide (PEO), Polysulfone (PSU), Polyurethane (PU), Polyamide-imide (PAI), Polyethersulfone (PESU), Polystyrene (PS), Polyetherimide (PEI), Acrylonitrile Butadiene Styrene (ABS), Polyimide (PI), and Polycarbonate (PC).

6. The battery of claim 1, wherein the one or more polymers have a melting temperature or a glass transition temperature of at most 180° C.

7. The battery of claim 1, wherein the plurality of inorganic particles are not electrically conductive.

8. The battery of claim 1, wherein the electrolyte has at least 50% of the first ionic conductivity at room temperature, when cooled to room temperature after being heated above $T_c$.

9. The battery of claim 1, wherein a thickness of the thermally responsive composite is between 0.5-15 μm.

10. The battery of claim 1, wherein a response time of the thermally responsive composite is at least 1 second.

11. The battery of claim 1, wherein $T_c$ is below a temperature at which the anode, cathode, or primary electrolyte layer decompose to produce gaseous species.

12. The battery of claim 1, wherein the primary electrolyte layer has a higher ionic conductivity than the thermally responsive composite.

13. The battery of claim 1, wherein the plurality of inorganic particles comprise an oxide-based composition.

14. The battery of claim 1, wherein the plurality of inorganic particles comprise an sulfide-based composition.

15. The battery of claim 1, wherein the plurality of inorganic particles comprise an phosphate-based composition.

16. The battery of claim 1, wherein the plurality of inorganic particles comprise a crystalline composition.

17. The battery of claim 1, wherein the plurality of inorganic particles comprise a partially crystalline composition.

18. The battery of claim 1, wherein the plurality of inorganic particles comprise an amorphous composition.

19. The battery of claim 1, wherein the plurality of inorganic particles are coated with a protective layer comprising one or more materials selected from the group consisting of: aluminum oxide (Al2O3), zirconium oxide (ZrO2), and titanium dioxide (TiO2).

20. The battery of claim 1, wherein the thermally responsive composite layer does not comprise any ionically conductive polymers.

21. The battery of claim 1, wherein the thermally composite layer comprises an additional one or more polymers that are not ionically conductive, wherein the one or more polymers that have a positive coefficient of thermal expansion and are not ionically conductive have a glass transition temperature and/or melting temperature at $T_c$, wherein the additional one or more polymers do not exhibit a change in physical or chemical properties at $T_c$.

22. The battery of claim 1, wherein the ionic conductivity of the primary electrolyte layer does not change at $T_c$.

23. A battery, comprising:
    an anode layer comprising anode active material;
    a cathode layer comprising cathode active material; and
    an electrolyte positioned between the anode layer and the cathode layer, the electrolyte comprising:
    a primary electrolyte layer comprising an inorganic phase that is ionically conductive and a polymer matrix, wherein the polymer matrix does not comprise any ionically conductive polymers, and
    a thermally responsive composite layer comprising:
        a plurality of inorganic particles that are ionically conductive between the anode layer and the cathode layer, and
        one or more polymers that have a positive coefficient of thermal expansion and are not ionically conductive, wherein the electrolyte has a first ionic conductivity below a cutoff temperature ($T_c$), and a second ionic conductivity that is no more than 1% of the first ionic conductivity at or above $T_c$, wherein $T_c$ is between 60° C. and 180° C., wherein the thermally responsive composite is a shutdown separator layer between the primary electrolyte layer and one of the anode layer and the cathode layer.

24. The battery of claim 1, wherein the primary electrolyte layer further comprises a filler material.

* * * * *